(No Model.) 3 Sheets—Sheet 3.

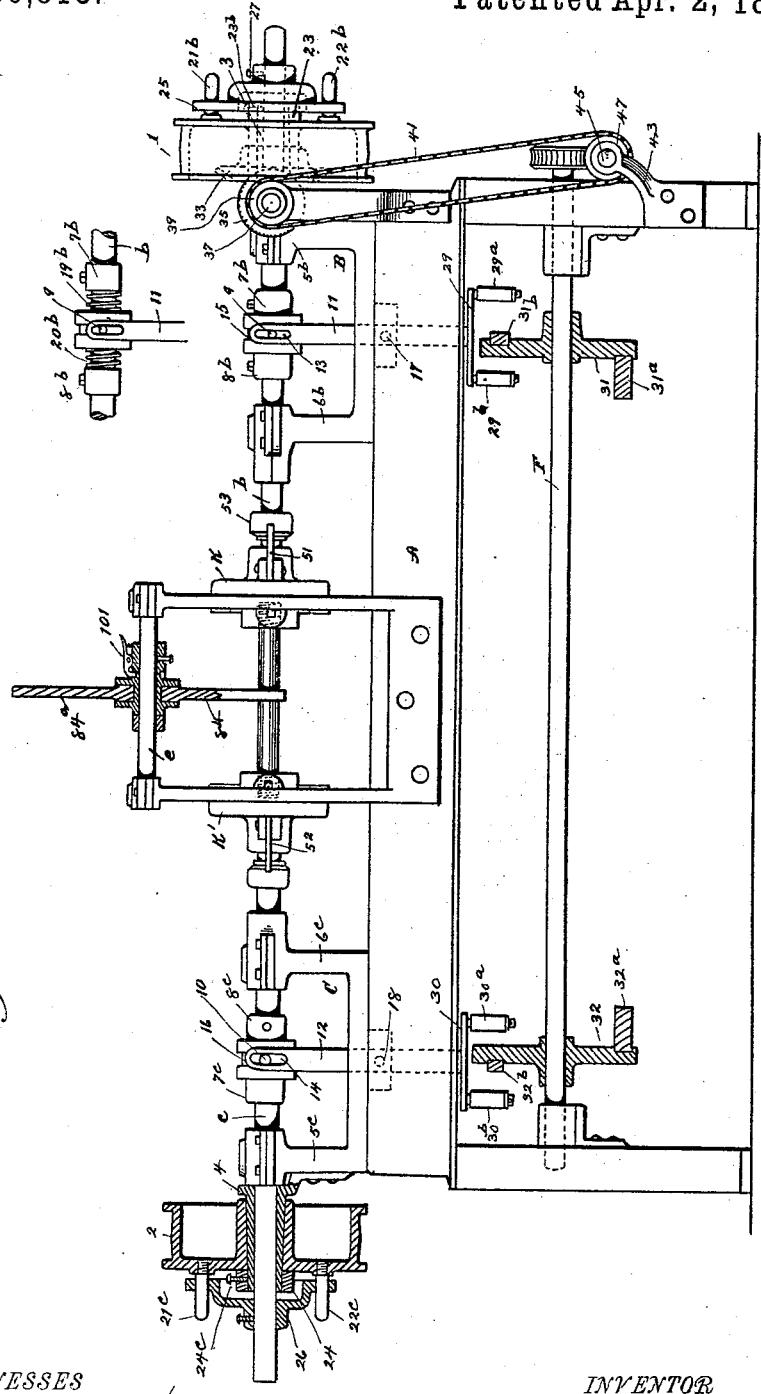

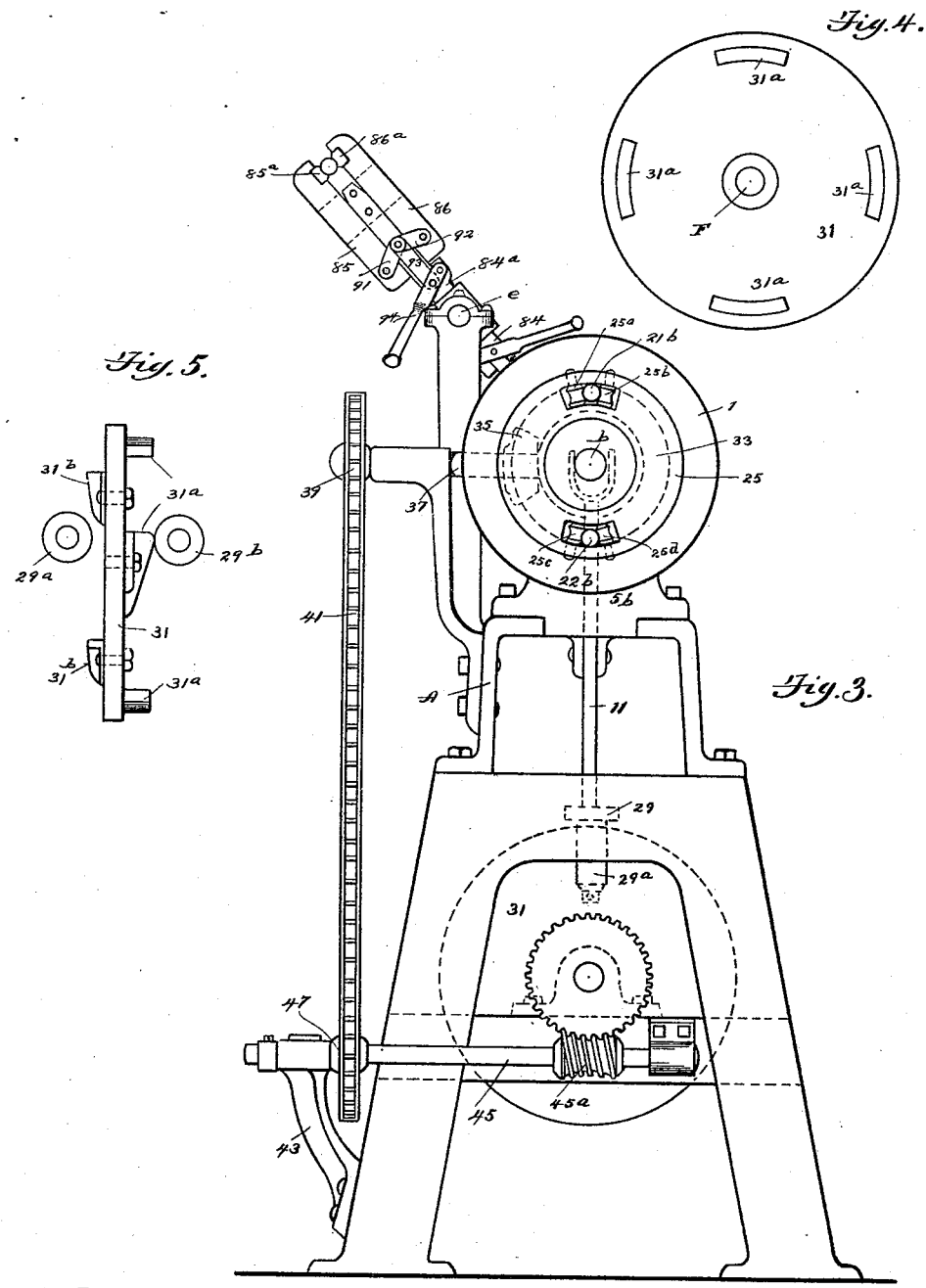

W. MURCHEY.
NIPPLE CUTTING MACHINE.

No. 536,815. Patented Apr. 2, 1895.

WITNESSES
H. Clough
D. W. Bradford

INVENTOR
William Murchey
By Parker & Burton
Attorneys.

UNITED STATES PATENT OFFICE.

WILLIAM MURCHEY, OF DETROIT, MICHIGAN.

NIPPLE-CUTTING MACHINE.

SPECIFICATION forming part of Letters Patent No. 536,815, dated April 2, 1895.

Application filed March 19, 1894. Serial No. 504,247. (No model.)

*To all whom it may concern:*

Be it known that I, WILLIAM MURCHEY, a citizen of the United States, residing at Detroit, county of Wayne, State of Michigan, have invented a certain new and useful Improvement in Nipple-Cutting Machines; and I declare the following to be a full, clear, and exact description of the invention, such as will enable others skilled in the art to which it pertains to make and use the same, reference being had to the accompanying drawings, which form a part of this specification.

This invention relates to a nipple threading device, and has for its especial object improvements in that class of machines in which a short piece of pipe or rod can be finished simultaneously at its two ends at the same time, the work done upon the nipple or bar being such as may be desired for any special purpose, and being determined by the character of the tool which is employed in connection with the chucks. Thus, for instance, it is sometimes desirable to hold a short piece of pipe at its middle point and thread both ends of the pipe at the same time, sometimes using a right hand thread at one end and a left hand thread at the other, and sometimes using right hand threads at both ends of the nipple. A short piece of bar or rod can be finished up in the same way, or, by changing the cutting tool, other work than that of forming threads may be done upon the nipple or on the bar, and the improvements in the machine which embody this present invention relate to the means for holding the nipple while under operation for holding the tool by which the work is to be done, and for automatically feeding the tool forward to its work, and returning it after its work has been performed.

Other improvements will be described more at length in the specification, and pointed out in the claims.

The main frame work of the machine is similar to that of a lathe or any similar machine.

Figure 6:
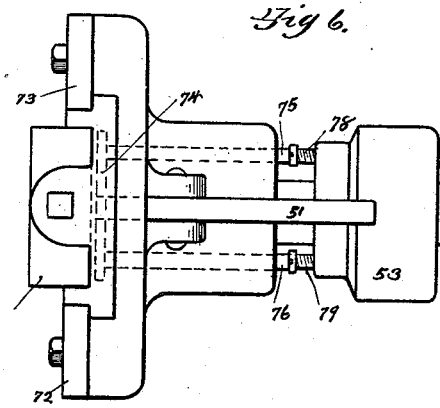
Figure 7:
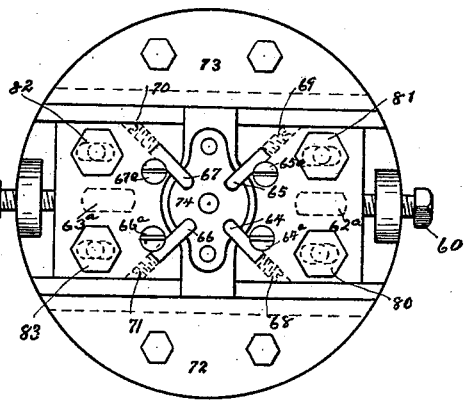
Figures 9, 10:
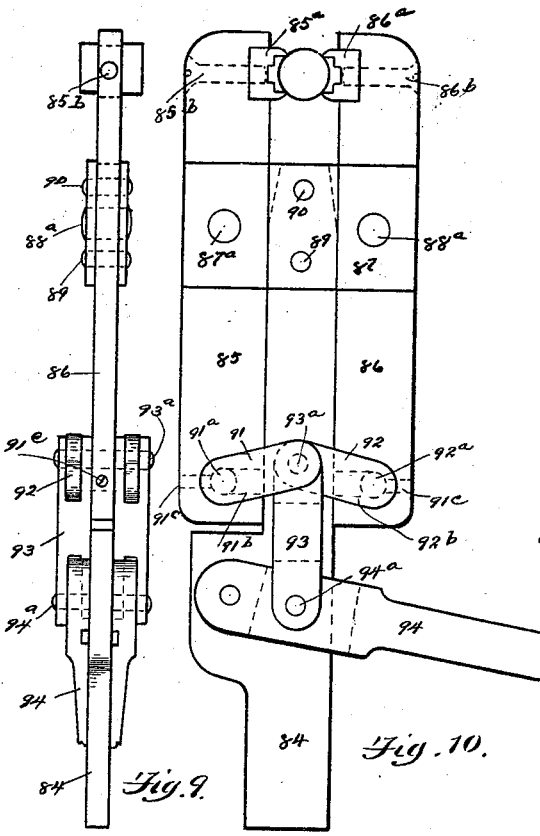
Figure 8:
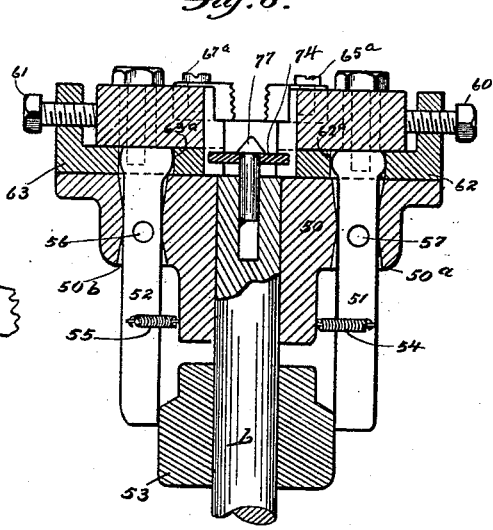

In the drawings, Figure 1 is a front elevation. Fig. 2 is a detail of a cushioning spring sometimes used in connection with the feeding mechanism. Fig. 3 is an end elevation of the machine. Fig. 4 is a side view of the cam wheel used in connection with the feeding mechanism. Fig. 5 is an edge view of the same cam wheel shown in Fig. 4. Figs. 6, 7, 8, 9 and 10 are enlarged details of the tool holding head and the work holding chuck, and, of these figures, Fig. 6 is a side elevation of the tool holding head; Fig. 7, a face or front elevation of the same; Fig. 8, a section of the head shown in Fig. 6; Fig. 9, an elevation of the chuck or work holding part of the machine as seen from the front; Fig. 10, an elevation of the same chuck as seen from the end of the machine.

The top of the main frame A is provided with ways similar to the ways of a lathe bed, and on each end of the ways is a puppet which may be fixed to the frame, but is preferably movable and adjustable along the ways. The two puppets B and C are similar in all respects, except that to one of them, as B, is connected mechanism suitable for driving the feed shaft F; and a detailed description of the puppet B will suffice for a full understanding of both of them.

The puppet is provided with two bearing arms, $5^b$ and $6^b$, on the upper ends of which are supported in suitable boxes a shaft $b$. On the arm $5^b$ is also a hollow conical journal 3, on which is supported the main driving wheel 1, held in place by a collar 23, which is secured to the outer extremity of the hollow conical journal 3 by a set screw $23^b$. From the face of the pulley 1, two pins $21^b$ and $22^b$ extend parallel with the axis of the mandrel $b$, and project through holes in a spider 25 and between the friction rollers $25^a$, $25^b$, $25^c$ and $25^d$, which are mounted on suitable radial spindles connected with the spider 25. The mandrel $b$ is capable of a movement lengthwise of its axis through its bearing supports, and through the hub of the main driving wheel 1. The spider 25 is secured to the mandrel $b$ by a set screw 27 and when the mandrel $b$ is moved along its axis, the spider moves along the pins $21^b$ and $22^b$, and at the same time continues to cause a revolution of the mandrel equal to that of the main driving wheel 1, from which the pins $21^b$ and $22^b$ spring. The form of connection described makes the strain on the mandrel from the driving wheel equal on the two sides of the center, and produces a very true circular movement of the mandrel, and frictional resistance to end movement is reduced to a minimum.

The axial movement of the mandrel $b$ is produced automatically and regularly from the main driving wheel 1 by means of the following described machinery: On the hub of the main driving wheel 1, which is shown to be a hollow or barrel wheel, is a beveled gear 33, and supported on the arm $5^b$ at right angles to the axis of the mandrel $b$ is a shaft 37, on one end of which is a pinion 35 that meshes with the bevel gear 33, and on the other end of which is a sprocket wheel 39 which carries a sprocket chain 41 to a second sprocket wheel 47. This second sprocket wheel 47 is supported by a bracket 43 on the main frame A, and is carried on one end of a shaft 45, one part of which is provided with a worm $45^a$. The worm $45^a$ meshes with a worm wheel on the shaft F, and on this shaft F are two cam wheels 31 and 32, one of which, 31, actuates the mandrel $b$, and the other of which, 32, actuates the mandrel $c$. To the main frame A is secured by a pin 17 a swinging lever 11, the lower end of which is forked and provided with two friction rolls, $29^a$ and $29^b$, one of which friction rolls, $29^a$, is adapted to engage with cams $31^b$ at one side of the cam wheel 31, and the other of which friction rolls, $29^b$, is adapted to engage with cams $31^a$ on the opposite side of the cam wheel 31. These cams $31^a$ and $31^b$ rise from the two faces of the wheel 31 somewhat after the fashion of crowned ratchet teeth, and are so arranged with respect to each other that the cams $31^a$ drive the lower end of the lever 11 in one direction, until the cam passes out of engagement with the friction roller $29^b$. Then the cam $31^b$ engages the friction roll $29^a$, and drives the lower end of the lever 11 in the opposite direction until the thread on the nipple has commenced to be formed. The nipple then draws the cutting head forward until the engagement between the nipple and the reamer, as hereinafter explained, spreads the cutting jaws, when, in turn, a second cam on the same side with $31^a$ engages with the roller $29^b$, thus vibrating the lower end of the lever 11 constantly and regularly. The upper end of the lever 11 is forked, and each branch of the fork is provided with a slot 13. Between the two branches of the fork is a collar 15, movable upon the mandrel $b$, but secured from turning with respect to it by a feather, and provided with two pins or trunnions on opposite sides, one of which, 9, is seen in Figs. 1 and 2. The trunnions 9 pass through the slot 13 in the end of the lever 11, and, as the lever 11 is vibrated in the way previously described, the movable collar 15 is vibrated in a corresponding degree. The movable collar 15 produces a corresponding movement of the mandrel $b$, either directly, as shown in Fig. 1, where it is secured in place by means of two collars $7^b$ and $8^b$, which are held to the mandrel $b$ by set screws,—or indirectly, as shown in Fig. 2, where it is held between two cushioning springs $19^b$ and $20^b$, which are interposed between it and the collars $7^b$ $8^b$. These cushioning springs may be used or not, as may be desired, depending on the character of the work that is to be produced, and the accuracy of adjustment in some of the other parts.

The location and operation of corresponding parts on the puppet C are similar in every respect to those already described in connection with the puppet B, except that from the puppet C is omitted the mechanism connecting the driving wheel with the shaft F. The mechanism already described feeds the mandrel $b$, on which is a cutter head, forward to the work, which is held fixed with respect to the cutters.

The cutter heads are shown at K K', in Fig. 1, and the details of a cutter head are shown in Figs. 6, 7 and 8. $b$ indicates the mandrel, at the end of which is a plate 50, through which are two perforations, $50^a$ and $50^b$, parallel with the axis of the mandrel $b$. In each perforation is hung a lever, one of which is indicated at 51, and the other at 52. The levers are hung on pins 56 and 57, and the perforations $50^a$ and $50^b$ are each larger than the body of the lever which passes through it, so that the lever is capable of a movement on its pin. The forward ends of these levers engage with sliding plates 62 and 63, which are held to the face of the plate 50 by overhanging holding plates 72 and 73, and held from escaping from underneath the plates 72 and 73 by the engagement between themselves and the ends of levers 51 and 52, which are received in holes or recesses $62^a$, $63^a$, in the plates. The lever 51 engages with the plate 62, and the lever 52 engages with the plate 63. The extreme forward end of each lever 51, 52, is finished with curved bearing surfaces. A light spring 54 tends to hold the outer end of the lever 51 in toward the shaft $b$, and a similar light spring 55 tends to hold the outer end of the lever 52 in toward the shaft $b$, and this spring tension on the outer ends of the two levers 51, 52, tends to throw the sliding plates 62 and 63 outward. On the shaft $b$ is a sliding block 53, the forward end of which,—or that end which lies nearest to the head,—is coned, the smaller part of the cone being of a size such that the block will enter freely between the outer ends of the levers 51 and 52, and back of the cone the block 53 is provided with a cylindrical bearing surface of a size proper to bring the levers 51 and 52 and the sliding plates 62 and 63 to a position where the cutters will properly engage with the work under treatment. The sliding block 53 is pushed back out of engagement with the levers 51 and 52 by pins 75, 76 (seen in Fig. 6), which are connected by a yoke 74, to which is secured a reamer 77. This reamer may be smooth, so as to do no cutting, but simply to act as a pushing head, or it may be finished as a cutter to ream the inside of the nipple for a distance, and then act as a pushing head. The block 53 is pushed into engagement under the ends of the levers 51 and 52 by the retraction of the mandrel $b$, through the feeding mechanism already described. When the mandrel $b$ is retracted, the sliding block 53 is drawn back with it through the frictional engagement between the two, until the block 53 engages with the front surface of the arm $6^b$. A further retraction of the mandrel $b$, which carries the head with it, forces the ends of the levers to rise up over the coned forward end of the sliding block 53, and brings the cutting dies to their position for work. When the mandrel $b$ is again fed forward, the block 53 moves forward with it, under the levers 51 and 52, being held in place now by the frictional contact between itself and the mandrel and the frictional contact between itself and the levers, its forward motion not being prevented by any of the operative parts of the machine. The plates 62 and 63 are thus forced inward when the block 53 is driven toward the head end of the mandrel $b$, and are held firmly in place by the combined action of the levers 51 and 52, the overhanging plates 72 and 73, and the holding screws 80, 81, 82 and 83. These screws 80, 81, 82, 83 hold in the plate 50, into which they are passed through oval holes in the sliding plates 62 and 63. The plates 62 and 63 carry the cutting tools which are separable pieces 64, 65, 66 and 67, inserted in radial slots and held to place by the screws 68, 69, 70 and 71, which lie radially in the slots, and are adapted to force the cutting tools forward to their place of work. The cutting tools are held from escape sidewise by the flat headed screws $64^a$, $65^a$, $66^a$ and $67^a$. When the cutting head is forced forward by the feeding mechanism, the sliding block 53 is in position to hold the rear end of the levers 51 and 52 out from the mandrel $b$, and to hold the sliding plates 62 and 63, in which are held the cutting tools, in the proper place to do the work desired. As soon as the mandrel has fed forward until the reamer 77 has done its work, and the collar 74 has come into engagement with the end of the work, the collar 74 is forced backward, carrying with it the pins 75 and 76, until those pins strike against the heads of adjustable screws 78 and 79 in the sliding block 53. The continued forward motion of the mandrel $b$ forces the sliding block back along the axis of the mandrel, until it passes out from under the ends of the levers 51 and 52. The tension of the springs 54 and 55 immediately draws the outer ends of the levers 51 and 52 toward the axis of the mandrel $b$, and the cutting plates separate, and at this moment the feed is reversed by the alternating cams on the wheels 31 and 32, and the mandrel and cutting head move backward.

The work holding chuck is held at the middle of the machine in a bearing frame which is bolted, or otherwise fastened to the main frame work A, and carries at its upper extremity a shaft $e$, on which are a pair of swinging chuck supporting arms 84 and $84^a$. The details of one of these arms, with the parts connected with it, which form the chuck, are shown in Figs. 9 and 10. At the outer end of the arm 84 is secured a yoke 87, held to the arm 84 by two bolts, 89 and 90. The yoke 87 consists of two pieces, one on each side of the arm 84, and between the two pieces are two pins $87^a$ and $88^a$, which form the hinges for two jaw pieces 85 and 86. At the outer end of the jaw pieces 85 and 86, are carried the jaws $85^a$, $86^a$, each being held to its respective jaw lever by a screw $85^b$, $86^b$. At the inner ends of the jaw levers are secured two links, 91 and 92, held together by a common knuckle pin $93^a$, and held to the jaw levers by pins $91^a$ and $92^a$, each of which are capable of adjustment across the axis of its proper jaw lever, the adjustment being effected by means of the pin $91^a$, which is capable of movement across the axis of its lever in a slot $91^b$, and is held inward by a set screw $91^c$. To the knuckle pin $93^a$ is connected a link 93, reaching to and secured by a pin $94^a$ to a hand lever 94 that is fulcrumed on the main arm 84. The actuation of the hand lever 94, acting through the various links and levers referred to, causes the opening and closing of the jaws $85^a$, $86^a$.

The operator, while one piece of material is being acted upon by the cutter heads, places the second one in the jaws of the opposite chuck, and, while the cutter head is moving back from its work, preparatory to being rearranged and placed in cutting position, the operator swings the rotating chuck similar to the manner in which an ordinary turret head is swung, and brings the second arm of the chuck with fresh work to the place to be operated upon by the cutter heads on its next advance.

As this machine is intended to be used for continuous work on a standard size of nipple to which the machine has been adjusted, it is not necessary that the movement of the jaws of the chuck should be great, but only sufficient to enable the work to be placed in them and taken from them, and this operation can be constantly repeated for a given class of work. Should it be desired to work upon rods or nipples of different diameters, the grips, $85^a$, $86^a$, can be changed, or the links 91 and 92 can be adjusted or changed for other longer or shorter links, as may be desired.

The chuck revolves on the arbor $e$, and is held in its position with the nipples to be acted upon by the cutting heads, by the engagement between a pawl 101, which is located on the arbor, and a notch in the hub of the chuck.

Having thus described my invention, what I claim as novel is—

1. In a nipple cutting machine, the combination of a main framework, a main driving wheel, a mandrel connected with the axis thereof, and adapted to reciprocate longitudinally therethrough, a spider secured to the mandrel and provided with pins adapted to engage with the main driving wheel a cutter head provided with radially movable cutters, and with levers adapted to actuate said cutters, a sliding wedge block on the mandrel adapted to actuate the levers, and to itself engage, alternately with a fixed part of the frame and with the work, and be thereby stopped while the mandrel reciprocates through it, a counter-shaft carrying a cam wheel, a lever actuated by said cam wheel, adapted to engage with and produce reciprocating motion of the mandrel, and means intermediate the driving wheel and counter shaft whereby the movement of the one is transmitted to the other and the reciprocating motion of the mandrel regulated with respect to its rotary movement, substantially as specified.

2. In a head for nipple cutting machines the combination of cutting tools adjustably secured in radially movable carrying plates levers adapted to produce such radial movement means for locking the levers and cutters in place and a centrally located reamer adapted to actuate the locking means, and push it out of locking engagement substantially as described.

3. In combination with the cutting head of a nipple cutting machine having spreading cutters and levers adapted to spread the same, a locking block, a reamer adapted to engage with the work and with the locking block, and adjusting screws adapted to regulate the engagement between the reamer and block and time the unlocking engagement with respect to the advancing motion of the cutter head, substantially as described.

4. In combination with a reciprocating mandrel, a sleeve bearing and a driving pulley mounted thereon, a spider on the mandrel having radial spindles and friction wheels mounted thereon, and pins extending from the face of the driving pulley and engaging between the friction wheels substantially as specified.

In testimony whereof I sign this specification in the presence of two witnesses.

WILLIAM MURCHEY.

Witnesses:
CHARLES F. BURTON,
FRANCES CLOUGH.